United States Patent
Tennent et al.

(10) Patent No.: US 6,698,247 B2
(45) Date of Patent: Mar. 2, 2004

(54) METHOD AND FEEDSTOCK FOR MAKING SILICA BY FLAME COMBUSTION

(75) Inventors: David L. Tennent, Campbell, NY (US); Joseph M. Whalen, Corning, NY (US)

(73) Assignee: Corning Incorporated, Corning, NY (US)

( * ) Notice: Subject to any disclaimer, the term of this patent is extended or adjusted under 35 U.S.C. 154(b) by 166 days.

(21) Appl. No.: 09/848,904

(22) Filed: May 4, 2001

(65) Prior Publication Data

US 2002/0162357 A1 Nov. 7, 2002

(51) Int. Cl.[7] .............................................. C03B 37/075
(52) U.S. Cl. .............................. 65/397; 65/398; 65/17.4
(58) Field of Search ......................... 65/397, 398, 17.4; 423/336, 337

(56) References Cited

U.S. PATENT DOCUMENTS

| | | | |
|---|---|---|---|
| 4,162,908 A | * | 7/1979 | Rau et al. .................... 65/60.53 |
| 4,221,825 A | * | 9/1980 | Guerder et al. .............. 427/452 |
| 4,367,013 A | * | 1/1983 | Guerder et al. ........... 428/542.8 |
| 4,629,485 A | | 12/1986 | Berkey ......................... 65/3.11 |
| 5,895,515 A | * | 4/1999 | Ishikawa et al. ............... 65/377 |

FOREIGN PATENT DOCUMENTS

| | | | |
|---|---|---|---|
| EP | 0 208 086 | 5/1986 | ......... C03B/37/018 |
| EP | 1 063 203 | 12/2000 | ............. C03C/3/06 |
| JP | 59-162143 | 9/1984 | ............. C03C/1/02 |
| JP | 60-86039 | 5/1985 | ............. C03B/8/04 |
| WO | WO 01/83388 | 11/2001 | ......... C03B/37/014 |

OTHER PUBLICATIONS

Patent Abstracts of Japan, JP 60–086039; May 15, 1985; I. Nobuo; Nippon Telegr & Teleph Corp.
Patent Abstracts of Japan; JP 62–143840; Jun. 27, 1987; T. Yoshiyuki; MItsui Toatsu Chem Inc.
Patent Abstracts of Japan; JP 62–143839; Jun. 27, 1987; T. Yoshiyuki; Mitsui Toatsu Chem Inc.
Patent Abstracts of Japan; JP 59–162143; Sep. 13, 1984; Shohei; Shin Etsu Chem Co. Ltd.
Patent Abstracts of Japan; JP 62–252335; F. Keitaro; Shin Etsu Chem Co. Ltd. Apr. 11, 1987.
Patent Abstracts of Japan, JP 09–086937; Mar. 31, 1997; S. Kausumi; Shin Etsu Chem Co. Ltd.

* cited by examiner

Primary Examiner—Sean Vincent
(74) Attorney, Agent, or Firm—Adenike Adewuya

(57) ABSTRACT

A method for making silica includes delivering a silica precursor comprising a perfluorinated group to a conversion site and passing the silica precursor through a conversion flame to produce silica soot.

31 Claims, 3 Drawing Sheets

METHOD AND FEEDSTOCK FOR MAKING SILICA BY FLAME COMBUSTION

BACKGROUND OF INVENTION

1. Field of the Invention

The invention relates generally to methods and feedstock for making silica.

2. Background Art

Silica is a particularly suitable material for forming the core and cladding of an optical waveguide. For the core of the optical waveguide, silica may be doped with a small amount of other dopant materials, such as titanium oxide, tin oxide, phosphorous oxide, aluminum oxide, and germanium oxide, to slightly increase the refractive index of the core above that of the cladding. In other fibers the core is pure silica and the cladding is down doped with fluorine. Optical waveguides exhibiting very low losses are generally formed by vapor deposition processes. In one such process, a silica precursor is introduced into a conversion flame to produce fine particles, called "soot." A dopant material, such as $GeCl_4$, may also be introduced into the conversion flame along with the silica precursor (e.g., $SiCl_4$). The soot is deposited on an outside surface of a rotating mandrel to form a soot preform. After an appropriate diameter of the core of the waveguide is reached, the mandrel is removed from the soot preform, leaving a hole in the soot preform. The soot preform is then sintered to form a consolidated glass draw preform. Next, the preform is drawn to close the hole and stretch the preform into a core cane of constant diameter. The core cane is then cut into segments, each of which becomes a deposition surface for cladding. The core cane is overclad with silica soot to an appropriate diameter and again consolidated. The resulting preform is then drawn until an optical waveguide having the desired dimensions is formed. For multi-segment fiber profiles, such as W profiles or ringed profiles, this process may include several steps of deposition, consolidation, and core-cane formation, with the dopants being provided to accomplish the desired refractive index for each segment.

Silica has also found a variety of uses in applications requiring transmission of ultraviolet radiation, particularly at wavelengths below 300 nm. One such application is in microlithography systems, which are employed in the production of integrated circuits. These systems use multiple fused silica lenses, called stepper lenses, to transmit radiation from excimer lasers to photosensitized silicon wafers. Current microlithography systems use 248-nm radiation (KrF laser) or 193-nm radiation (ArF laser) to print patterns with width as small as 0.25 μm. More advanced microlithography systems using 157-nm radiation ($F_2$ laser) are actively under development and are expected to produce patterns with even smaller widths. Microlithography systems require lenses made from high-purity fused silica because impurities in the lenses can distort the images projected onto the wafers as well as decrease transmission of the lenses. High-purity fused silica is typically produced by the boule process. The conventional boule process involves passing a silica precursor into a flame of a burner to convert the silica precursor to soot. The soot is then directed downwardly to a bait and immediately consolidated into dense, transparent, bulk glass, commonly called a boule. The boule can be used individually to fabricate stepper lenses as well as other optical elements such as photomasks.

It has been found that the selection of the silica precursor used in the production of silica is as important as the design of the equipment used to produce the silica. For a long time, the standard feedstock used in the production of silica was $SiCl_4$. $SiCl_4$ was chosen because it yielded large amounts of vapors at low temperatures. Flame combustion of $SiCl_4$, however, has a drawback because it produces chlorine gas as a by-product. If the conversion flame is provided by combustion of a hydrogen-containing fuel, which is usually the case, hydrogen chloride gas is also produced as a by-product. Moreover, large amounts of water ($H_2$, OH, and $H_2O$) are formed. These gases are environmentally unfriendly and require considerable care for their disposal. In addition, chlorine has been found to decrease transmission at 157 nm. This makes chlorine-based silica precursors unsuitable for making, for example, fused silica lenses for 157 nm applications.

Hydrogen-containing organic compounds such as octamethlytetrasiloxane and silane have been identified as satisfactory chlorine-free precursors for producing silica. However, flame combustion of these precursors also inherently result in the silica containing residual water, i.e., OH, $H_2$, and $H_2O$. In optical waveguides and 157-nm applications it is preferable that the silica is substantially free of residual water. For optical waveguides, residual water in the silica results in high transmission loss in the optical waveguide. In preparation of fluorine-doped soot preform for optical waveguides, residual water is detrimental becomes it promotes fluorine migration. Water is known to reduce transmission of fused silica at wavelengths below 185 nm. Therefore, there is a strong interest in a method of producing silica that is substantially free of water and chlorine.

SUMMARY OF INVENTION

In one embodiment, the invention relates to a method for making silica which comprises delivering a silica precursor comprising a perfluorinated group to a conversion site and passing the silica precursor through a flame to produce silica soot. The perfluorinated group preferably comprises a group selected from the group consisting of alkyl, alkenyl, alkoxy, and aryl.

In another embodiment, the invention relates to a method for making silica which comprises a silica precursor comprising a chloro-derivative or fluoro-derivative or both to a conversion site and passing the silica precursor through a flame to produce silica soot.

Other features and advantages of the invention will be apparent from the following description and the appended claims.

DETAILED DESCRIPTION

Embodiments of the invention use silicon compounds containing a perfluorinated group as replacements for the chloride-based and hydrogen-containing organic feedstock that are oxidized by flame hydrolysis to produce silica. The silicon compounds containing a perfluorinated group have the advantage of being oxidized without inclusion of water or chlorine in the silica. In general, the silicon compound may be any perfluorinated alkoxy-, alkyl-, alkenyl-, or aryl-silane. Representative formulae of these silicon compounds include, but are not limited to, $Si(OR_F)_xF_{4-x}$ and $Si(R_F)_xF_{4-x}$, where $R_F$ is any perfluorinated alkyl, alkoxy, alkenyl, or aryl group and x is an integer ranging from 1 to 4.

In applications, such as fiber applications, where chlorine level in the silica is not of concern, the silicon compounds containing a perfluorinated group may also contain chlorine and/or fluorine as substituents. A representative formula of these silicon compounds is $SiCl_xF_y(R_F)_z$, where x, y, and z are integers, the sum of x, y, and z is 4, and $R_F$ is any perfluorinated alkyl, alkoxy, alkenyl, or aryl group.

In other embodiments where chlorine level in the silica is not of concern, silicon compounds containing chloro derivatives, fluoro derivatives, or chloro-fluoro derivatives may be used as a precursor in making the silica. Representative formulae of these types of silicon compounds include, but are not limited to, $Si(R_F)_4$ and $Si(OR_F)_4$, where $R_F$ is $CF_3$, $CClF_2$, $CCl_2F$, $CCl_3$, $C_2F_5$, and so forth.

Figure 1A:
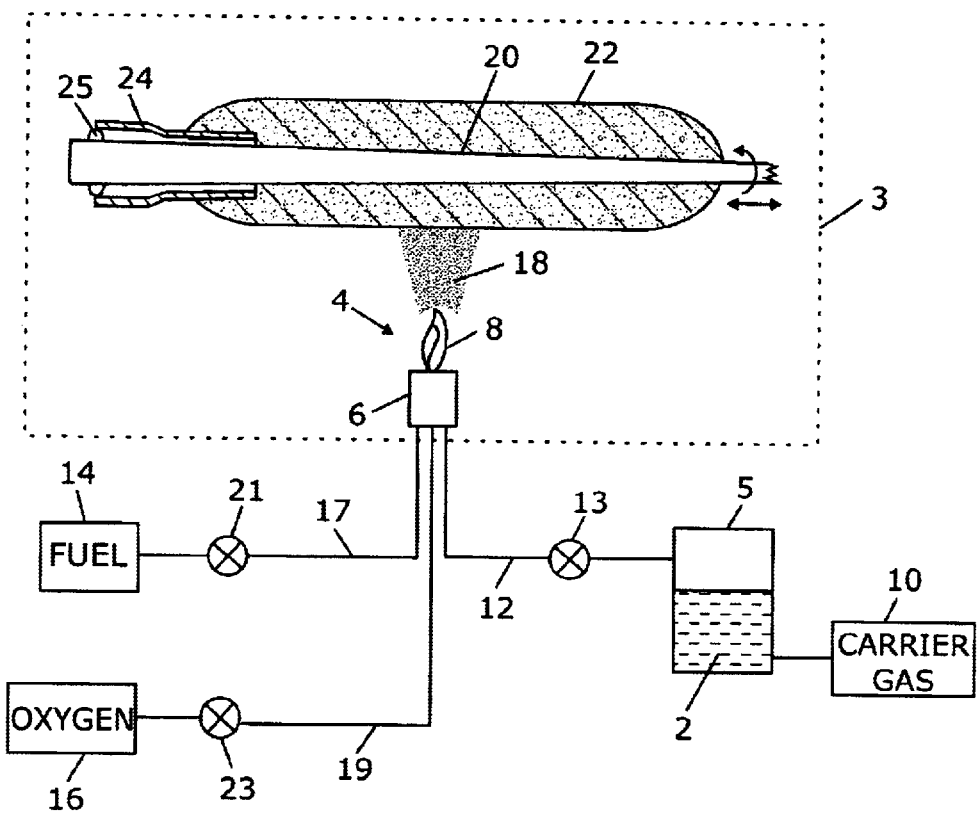
FIG. 1A is a schematic representation of an OVD process for producing an optical waveguide preform.

Various embodiments of the invention will now be described with reference to the accompanying drawings. FIG. 1A is an exemplary schematic representation of an outside vapor deposition (OVD) process for producing an optical waveguide preform according to an embodiment of the invention. The process for producing the optical waveguide preform includes delivering a silica precursor 2 to a conversion site 4. The silica precursor 2 may be any of the silicon compounds described above. Preferably, the conversion site 4 includes at least one burner 6 which produces a conversion flame 8. The burner 6 produces the conversion flame 8 by burning a fuel 14 and oxygen 16. The fuel 14 and oxygen 16 may be separately delivered to the burner 6 through fume lines 17 and 19, respectively. Mass flow controllers 21 and 23 are provided to control the rate at which fuel 14 and oxygen 16 are delivered to the burner 6. Alternatively, the fuel 14 and oxygen 16 may be mixed together in a premixing chamber (not shown). The fuel/oxygen mixture can then be delivered to the burner 6.

The oxygen 16 supplied to the burner 6 may be in its pure state or may be admixed with inert gases such as nitrogen, argon, helium, carbon dioxide, or chlorine. To provide a hydrogen-free environment for the OVD process, the fuel 14 preferably does not contain hydrogen or water. A suitable fuel for this purpose is carbon monoxide. To use carbon monoxide, a precursor which burns exothermically is desired because of the somewhat lower flame temperature as compared to, for example, $CH_4$. Other examples of fuels include, but are not limited, to those containing $(CN)_2$, $(CNO)_2$, or a mixture of these gases. The fuel 14 may also be CO mixed with $(CN)_2$, $(CNO)_2$, $D_2$ or a mixture of these gases.

In one embodiment, the silica precursor 2 is delivered to the burner 6 in vapor form. If the silica precursor 2 does not exist in vapor form at room temperature, a liquid feedstock of the silica precursor 2 may be vaporized in a container 5, which may be a vaporizer, bubbler, or other similar equipment for vaporizing the feedstock. In this case, an inert carrier gas 10 is passed through the generated vapors to entrain the vapors and carry them to the burner 6 through a tubing 12. The inert carrier gas 10 could be any nonflammable gas such as nitrogen, noble gases (e.g., argon, helium, neon, krypton, xenon), nitrogen oxide, or fluorinated gases. Typical fluorinated gases are $CF_4$, chlorofluorocarbons, e.g., $CF_xCl_{4-x}$, where x is an integer ranging from 1 to 3, $NF_3$, $SF_6$, $SiF_4$, $C_2F_6$, and $SF_6$. It should be noted that chlorofluorocarbons should be avoided if a chlorine-free process is desired. While transporting the silica precursor vapors to the burner 6, the tubing 12 may be heated to prevent condensation of the vapors. Also, another stream of inert gas (not shown), e.g., nitrogen, may be brought in contact with the silica precursor vapors to prevent saturation of the vapors. A mass flow controller 13 may be used to control the rate at which the vapors are delivered to the burner 6.

At the conversion site 4, the silica precursor vapors pass through the conversion flame 8 to form soot 18, which is deposited on a mandrel 20. Typically, the mandrel 20 is a tapered cylindrical member made of an inert material such as alumina. A glass handle 24 is provided over the mandrel 20 at one end and is used for gripping the soot preform 22 throughout the process. A spacer 25 holds the handle 24 relative to the mandrel 20 prior to depositing the soot 18 on the mandrel 20. To allow for uniform deposition, the mandrel 20 is rotated and translated axially as layers of the soot 18 are deposited. To maintain the hydrogen- and water-free environment, the conversion site 4 and mandrel 20 should be enclosed in an atmosphere that is free of moisture and hydrogen gas, such as dry air or dry inert gas (e.g., argon, krypton, helium, neon, xenon, or nitrogen), as depicted by the dotted box 3 around the preform 22 and flame 8.

Figure 1B:
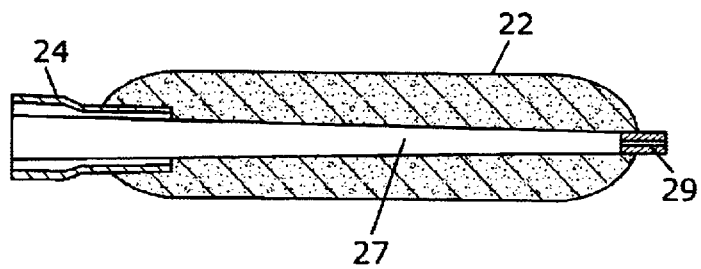
FIG. 1B is a schematic of a soot preform.

The soot 18 is deposited on the mandrel 20 until the appropriate diameter of the optical waveguide core, or soot preform 22, is formed. After deposition, the mandrel 20 is removed from the soot preform 22. Referring to FIG. 1B, removal of the mandrel (20 in FIG. 1A) leaves a hole 27 extending along an axial length of the soot preform 22. A plug-like member 29 made of pure silica is inserted at one end of the hole 27, i.e., the end that does not include the glass handle 24. The plug-like member 29 will close that end of the preform upon consolidation. The soot preform 22 is inserted into and held in a consolidation furnace (not shown) and fully consolidated. It should be noted that when the soot preform 22 is produced in a hydrogen- and water-free environment, a chlorine treatment to remove residual water may not be necessary before full consolidation. In this case, the soot preform 22 is also preferably transported to the consolidation furnace (not shown) in a substantially water-free environment.

The consolidated preform is drawn to close the hole 27 and stretched into core cane using conventional fiber draw techniques. The core cane is then cut into segments, each of which becomes a deposition surface for a silica overclad or further segments of the core, preferably including a fluorine dopant. The silica overclad or additional segments may be formed using the OVD process described above, except that the mandrel 20 will now be replaced with the core cane segment. The overclad core cane segment is finally consolidated and drawn into an optical waveguide. In the case where the cladding is F-doped, the dopant may be added during deposition or, more preferably, during consolidation as is described in U.S. Pat. No. 4,629,485 issued to Berkey. For multi-segment fiber profiles, such as W profiles and ring profiles, the process of forming the optical waveguide may include several steps of soot deposition, consolidation, and core cane formation. For example, the overclad core cane segment can be drawn using conventional fiber draw techniques, cut into segments, and then used as a deposition substrate for the next segment.

Figure 2:
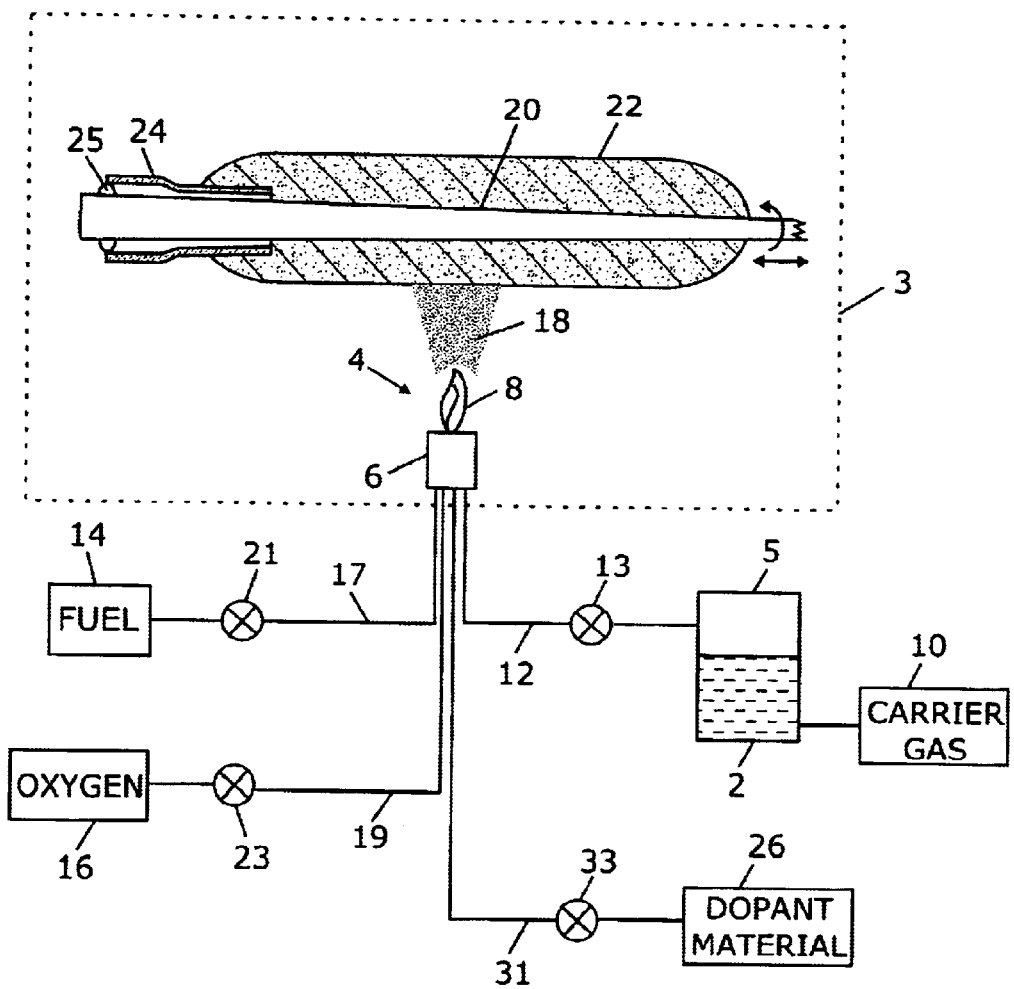
FIG. 2 illustrates a process for producing doped silica soot.

The soot 18 may be doped with materials, such as F, B, Al, Ge, Sn, Ti, P, Se, Er, S, Ca, Ba, Y, Yb, Ta, La, Sb, and Bi, during the OVD process or consolidation to create different index profiles. Typical fiber compositions include germania (GeO$_2$) in the core to provide a higher index than the clad. FIG. 2 illustrates a process for producing doped silica soot in deposition. The process is similar to the one described in FIG. 1A, except that an additional delivery system is needed for delivering the dopant material 26 to the burner 6. In the illustration, the silica precursor 2 and the dopant material 26 are separately delivered to the burner 6 through lines 12 and 31, respectively. Mass flow controllers 13, 33 are provided to control the rate at which the vaporous reactants 2, 26 are delivered to the burner 6. In an alternate embodiment, the silica precursor 2 may be mixed with the dopant material 26 prior to being delivered to the burner 6. Preferably, the dopant material 26 is a gaseous material or vaporizable material.

To maintain the hydrogen-free environment the dopant material 26 is preferably free of hydrogen. Similarly, to maintain a chlorine-free environment, the dopant material 26 is preferably free of chlorine. U.S. application ser. No. 09/848,903, entitled "Method and Feedstock for Making Silica," filed May 4, 2001, in the name of David L. Tennent and Joseph M. Whalen, discloses a chlorine-free germania dopant which comprises a pseudohalogen, e.g., Ge(NCO)$_4$.

Figure 3:
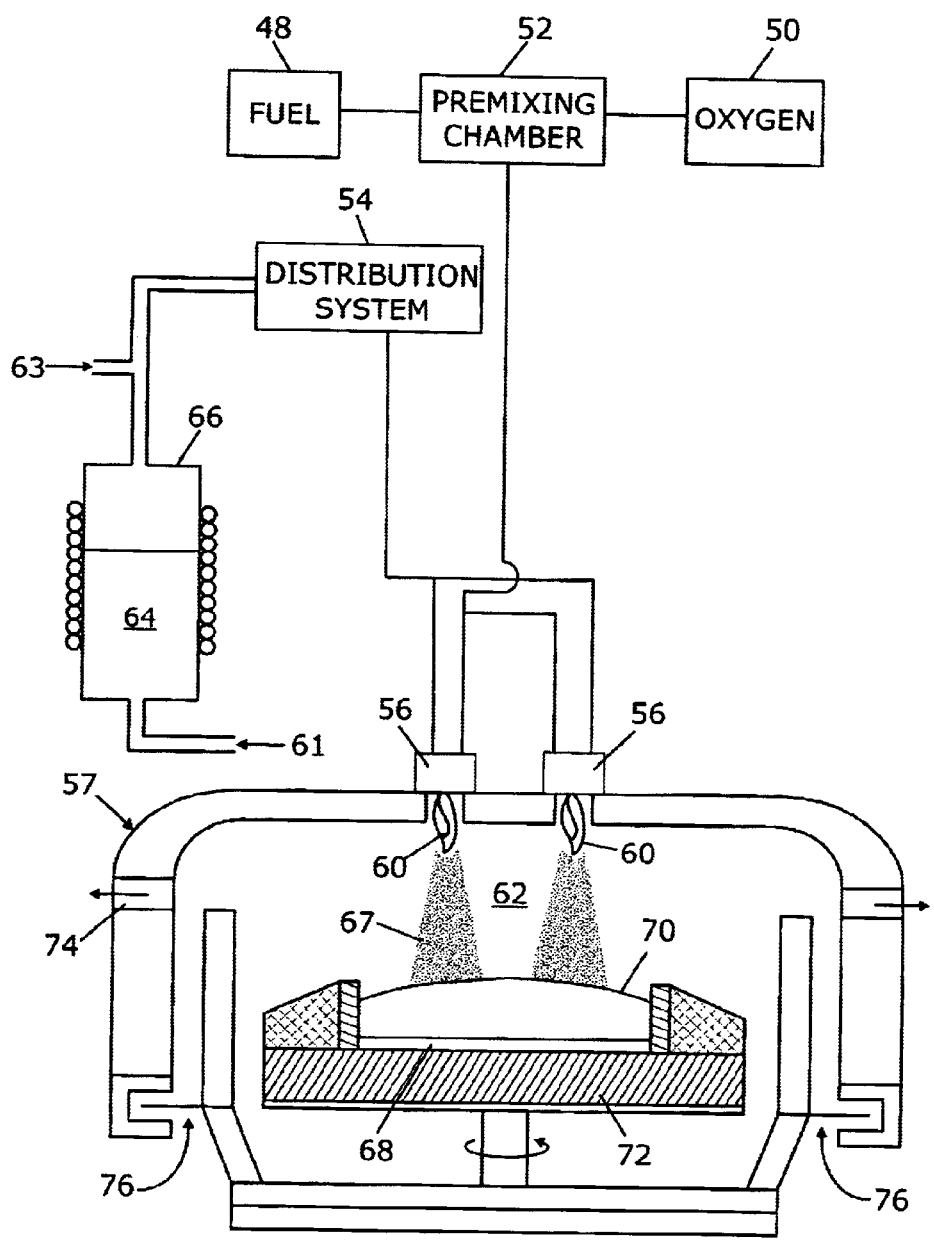
FIG. 3 is a schematic representation of a boule process for producing fused silica.

FIG. 3 is an exemplary schematic representation of a boule process for producing high purity fused silica using a silicon compound of the present invention. In the boule process, fuel 48 and oxygen 50 are mixed in a premixing chamber 52. The fuel/oxygen mixture is then transferred to burners 56 mounted at the crown of a furnace 57. To maintain a hydrogen-free atmosphere, the fuel 48 is preferably hydrogen-free. As previously mentioned, a suitable fuel for this purpose is carbon monoxide. The burners 56 ignite the fuel/oxygen mixture to produce flames 60, which typically preheat the deposition cavity 62 to a desired temperature. Although only two burners 56 are shown, more burners may be used to achieve uniform heat distribution across the deposition cavity 62. A silica precursor 64 is delivered in vapor form to a distribution system 54, which distributes the vapors to the burners 56. The silica precursor 64 may be any of the previously described silicon compounds. If the silica precursor 64 does not exist in vapor form at room temperature, a liquid feedstock of the silica precursor 64 may be vaporized in a container 66 and an inert carrier gas 61 may be used to transport the vapors to the distribution system 54. As also shown in the figure, an inert gas 63 may be brought in contact with the precursor vapors to prevent saturation.

The silica precursor 64 vapors pass through the flames 60 and are converted to soot 67. The soot 67 is deposited on a substrate 68 (typically made of silica) and immediately consolidated into dense glass 70. Consolidation typically occurs at roughly 1550° C. or greater. To ensure homogeneity, the substrate 68 is typically rotated and oscillated as the silica soot is deposited. Spurious soot formed during soot deposition is removed via draft ports 74 which are connected to an exhaust system (not shown). The furnace 57 is drafted using a purge gas 76. Preferably, the purge gas 76 is an inert gas, such as nitrogen, so that a substantially hydrogen-free environment is maintained. Generally, it is desirable to provide a pressurized atmosphere in the deposition cavity 62 greater than an atmospheric pressure outside of the deposition cavity 62.

Those skilled in the art will appreciate that various modifications to the embodiments described above are possible which are within the scope of the invention. For example, for the boule process, a dopant material, such as a hydrogen- and chlorine-free titania precursor, may be passed through the conversion flame along with the silica precursor to produce doped silica soot. The silica precursor of the present invention may also be used in other vapor deposition processes such as vapor-axial deposition process, wherein a column of soot preform is grown. In general, the invention can be used where the soot deposition and consolidation occur separately or simultaneously.

The invention described herein can make soot preforms or glass boules that are substantially free of hydrogen and chlorine. As previously discussed, such soot preforms and glass boules are useful in many applications, such as optical waveguide fabrication and lens and photomask fabrication.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for making silica, comprising:
   delivering a silica precursor comprising at least one perfluorinated carbon group ($R_F$) having a carbon atom bonded directly or through an intermediate oxygen atom to silicon to a conversion site; and
   passing the silica precursor through a conversion flame to produce silica soot.

2. The method of claim 1, wherein $R_F$ is selected from the group consisting of perfluorinated alkyl, alkenyl, and aryl groups.

3. The method of claim 1, wherein the silica precursor is represented by the general formula $Si(OR_F)_xF_{4-x}$, where is an integer ranging from 1 to 4.

4. The method of claim 1, wherein the silica precursor further comprises at least one substituent selected from the group consisting of fluorine and chlorine.

5. The method of claim 1, wherein the silica precursor is represented by the general formula $SiCl_xF_y(R_F)_z$, where x, y, and z are integers, and the sum of x, y, and z is equal to 4.

6. The method of claim 5, wherein $R_F$ comprises at least one substituent selected from the group consisting of chlorine and fluorine.

7. The method of claim 5, wherein $R_F$ comprises a group selected from the group consisting of perfluorinated alkyl, alkenyl, and aryl groups.

8. The method of claim 1, wherein the silica precursor is represented by the general formula $Si(R_F)_xF_{4-x}$, where x is an integer ranging from 1 to 4.

9. The method of claim 5, wherein $R_F$ comprises a group selected from the group consisting of perfluorinated alkyl, alkenyl, and aryl groups.

10. The method of claim 1, wherein the silica precursor is delivered to the conversion site in vapor form.

11. The method of claim 10, wherein the silica precursor is delivered to the conversion site in a gas stream comprising an inert gas.

12. The method of claim 1, wherein a fuel combusted to produce the flame comprises one selected from the group consisting of CO, $(CN)_2$, $(NCO)_2$, and combinations thereof.

13. The method of claim 1, further comprising delivering to the conversion site a compound capable of being converted to an oxide of at least one member of the group consisting of B, Al, Ge, Sn, Ti, P, Se, Er, S, Ca, Ba, Y, Yb, Ta, La, Sb, and Bi.

14. The method of claim 1, further comprising depositing the silica soot on a deposition surface.

15. The method of claim 14, further comprising consolidating the silica soot into glass.

16. The method of claim 15, wherein the deposition surface is provided by a rotating mandrel.

17. The method of claim 16, further comprising drawing the glass into a core cane.

18. A method for making fused silica, comprising:
delivering a silica precursor comprising at least one perfluorinated carbon group having a carbon atom bonded directly or through an intermediate oxygen atom to silicon to a conversion site;
passing the silica precursor through a conversion flame to produce silica soot; and
depositing the silica soot onto a deposition surface, wherein the silica soot is immediately consolidated into glass.

19. The method of claim 18, wherein the perfluorinated group is selected from the group consisting of perfluorinated alkyl, alkenyl, and aryl groups.

20. The method of claim 18, wherein the silica precursor is represented by the general formula $Si(OR_F)_x F_{4-x}$, where x is an integer ranging from 1 to 4.

21. The method of claim 18, wherein the silica precursor further comprises at least one substituent selected from the group consisting of fluorine and chlorine.

22. The method of claim 18, wherein the silica precursor is represented by the general formula $SiCl_x F_y (R_F)_z$, where x, y, and z are integers, and the sum of x, y, and z is equal to 4.

23. The method of claim 22, wherein $R_F$ comprises at least one substituent selected from the group consisting of chlorine and fluorine.

24. The method of claim 22, wherein ($R_F$) comprises a group selected from the group consisting of perfluorinated alkyl, alkenyl, and aryl groups.

25. The method of claim 18, wherein the silica precursor is represented by the general formula $Si(R_F)_x F_{4-x}$, where x is an integer ranging from 1 to 4.

26. The method of claim 25, wherein ($R_F$) selected from the group consisting of alkyl, alkenyl, and aryl groups.

27. The method of claim 18, wherein a fuel combusted to produce the flame comprises one selected from the group consisting of CO, $(CN)_2$, $(NCO)_2$, and combinations thereof.

28. A method for making silica, comprising:
delivering a silica precursor comprising at least one perhalogenated carbon group ($R_Z$) having a carbon atom bonded directly or through an intermediate oxygen atom to silicon to a conversion site; and
passing the silica precursor through a flame to produce silica soot.

29. The method of claim 28, wherein the silica precursor has a general formula selected from the group consisting of [[$S_f(R_F)_4$ and $S_F(OR_F)_4$]] $Si(R_Z)_4$ and $Si(OR_Z)_4$.

30. The method of claim 1, wherein $R_F$ is a perfluorinated alkyl group having carbon atoms ranging from 1 to 5, where all valences except for C—C, Si—C, or C—O linkages are satisfied by fluorine.

31. The method of claim 29, wherein $R_Z$ is a perhalogenated alkyl group having carbon atoms ranging from 1 to 5, where all valences except for C—C, Si—C, or C—O linkages are satisfied by halogens.

* * * * *